US008352878B2

(12) United States Patent
Duquene et al.

(10) Patent No.: US 8,352,878 B2
(45) Date of Patent: Jan. 8, 2013

(54) SCROLLABLE CONTEXT MENU FOR MULTIPLE ELEMENT SELECTION

(75) Inventors: Joel Duquene, Raleigh, NC (US); Morris S. Johnson, Jr., Cary, NC (US); Henri F. Meli, Cary, NC (US); Karline Vilme, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 12/567,439

(22) Filed: Sep. 25, 2009

(65) Prior Publication Data

US 2011/0078630 A1     Mar. 31, 2011

(51) Int. Cl.
*G06F 3/048*     (2006.01)
(52) U.S. Cl. ........ 715/787; 715/783; 715/817; 715/818; 715/833; 715/845
(58) Field of Classification Search .................. 715/783, 715/784, 786, 787, 810, 817–820, 830
See application file for complete search history.

(56) References Cited

U.S. PATENT DOCUMENTS

2005/0091604 A1*   4/2005   Davis ........................... 715/772
2006/0075357 A1*   4/2006   Guido et al. .................. 715/784

* cited by examiner

*Primary Examiner* — Haoshian Shih
(74) *Attorney, Agent, or Firm* — A. Bruce Clay

(57) ABSTRACT

Selections from a long list of elements on a Graphical User Interface (GUI) are presented. When a context window is presented for the selections, different cues are provided in the context window to provide feedback regarding the selections that are not in the current view, and to also facilitate rapid navigation to those selections on the GUI. Interaction with the GUI widgets within the context window, and interaction with the context window itself, facilitates the navigation toward the other selections that are not in the current view. Interaction with the GUI widgets also facilitates the preview of the selections that are not in the current view, thus making it easier to determine what has been selected without having to navigate to the view that contains those selections.

16 Claims, 6 Drawing Sheets

SCROLLABLE CONTEXT MENU FOR MULTIPLE ELEMENT SELECTION

FIELD OF THE INVENTION

The present invention relates to user interface tools, and more specifically, to multiple element selection with visual feedback.

BACKGROUND OF THE INVENTION

In many instances, a user needs to select multiple elements from a very long list which can easily span multiple pages on a computer display. Such a list will require the user to scroll through the pages. As elements are selected on a page in the current focused view, it is difficult to know which elements and how many elements have been selected on pages that are not currently in focus.

For example, it is difficult to know whether previously selected elements in other views are still selected, or if they were accidentally or inadvertently deselected, as may happen occasionally. Additionally, the user may not be able to recall how many elements have already been selected in the previous or subsequent views, or whether the previous or subsequent views have elements that had been selected, and if so, which ones. The user must page or scroll back-and-forth to find this out. Also, in a very long list, as the user pages or scrolls through the different views, it is not easy to know how far one needs to navigate before getting to a view that contains previously selected elements.

SUMMARY

According to one embodiment of the present invention a computer implemented method for navigating a long list of selectable elements spanning at least two pages of a computer display, comprises the steps of providing a scrollable context menu. A first user visual aid is positioned on the scrollable context menu to indicate at least one element selected in a previous view. A second user visual aid is positioned on the scrollable context menu to indicate at least one element selected in a next view.

The first user visual aid comprises an arrow pointing upward, and the second user visual aid comprises an arrow pointing downward. A third visual aid comprising a numerical count of elements selected in the previous view is positioned on the context menu. A fourth visual aid comprising a numerical count of elements selected in the next view is also positioned on the context menu.

By scrolling the context menu upward at least one element selected in a previous view can be viewed. By scrolling the context menu downward at least one element selected in a next view can be viewed. By placing a cursor over the first user visual aid on the scrollable context menu, a first list of at least one element selected in a previous view is displayed. By placing the cursor over the second user visual aid on the scrollable context menu, a second list of at least one element selected in a next view is displayed.

BRIEF DESCRIPTION OF THE SEVERAL VIEWS OF THE DRAWINGS

The foregoing and other features and advantages of the present invention will be more fully understood from the following detailed description of illustrative embodiments, taken in conjunction with the accompanying drawings, in which.

DETAILED DESCRIPTION

Figure 1:
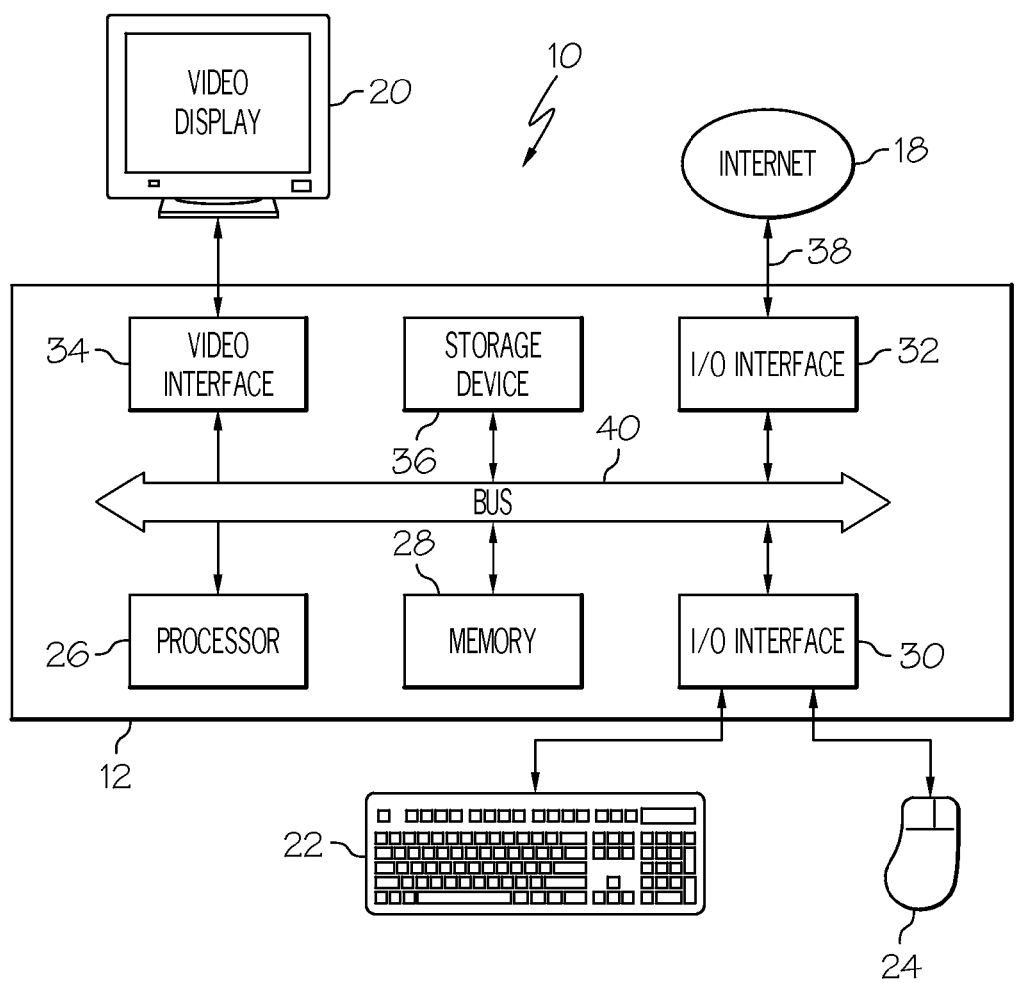
FIG. 1 is a hardware diagram that implements an embodiment of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment or an embodiment combining software and hardware aspects that may all generally be referred to herein as a "system." Furthermore, the present invention may take the form of a computer program product embodied in any tangible or readable storage medium having computer usable program code embodied in the medium.

Any combination of one or more computer usable or computer readable storage media may be utilized. The computer usable or computer readable storage medium may be, for example but not limited to, an electronic, magnetic, optical, electromagnetic, infrared, or semiconductor system, apparatus, or device. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer usable or computer readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer readable storage medium may be any medium that can contain, store, communicate, or transport the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is one example of a computer system 10 suitable for executing computer software for a scrollable context menu for multiple elements selection in long lists in accordance with the techniques described above. Other processing devices which are suitable for executing the software can be a wireless telephone, personal assistant device (PDA), portable computer, smart remote control device, or any other processing devices that can execute such software.

The computer system 10 is of a type that executes under a suitable operating system installed on the computer system 10, and may be thought of as comprising various software code means for achieving the particular steps of the aforementioned methods of for executing computer software for a scrollable context menu for multiple elements selection in long lists. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to video display 20 and provides video signals for display on the video display 20. User input to operate the computer 12 is provided from the keyboard 22 and mouse 24. The storage device 36 can include a disk drive or any other suitable storage medium. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18.

The computer software may be recorded on a computer-readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

Figure 2:
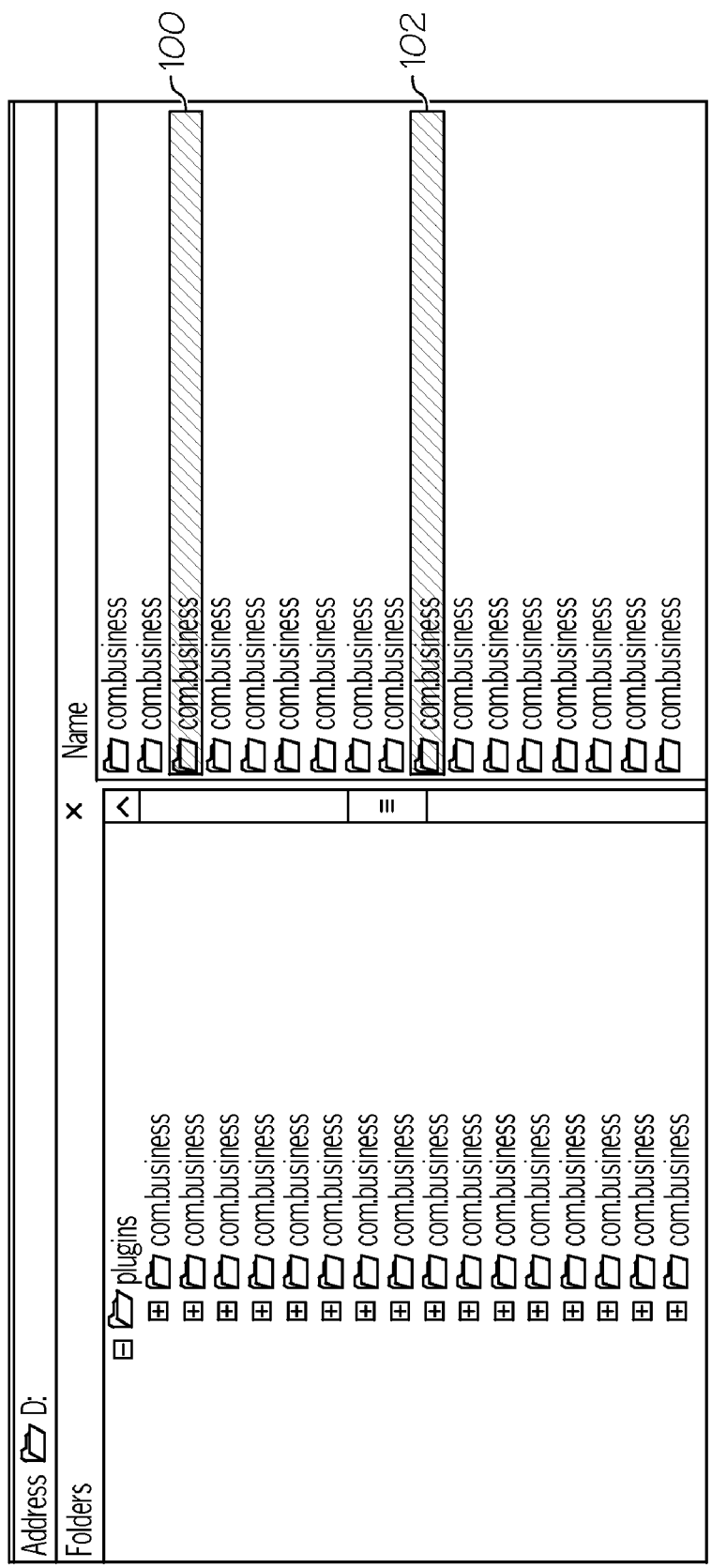
FIGS. 2 and 3 illustrate an example of a long list of elements.
Figure 3:
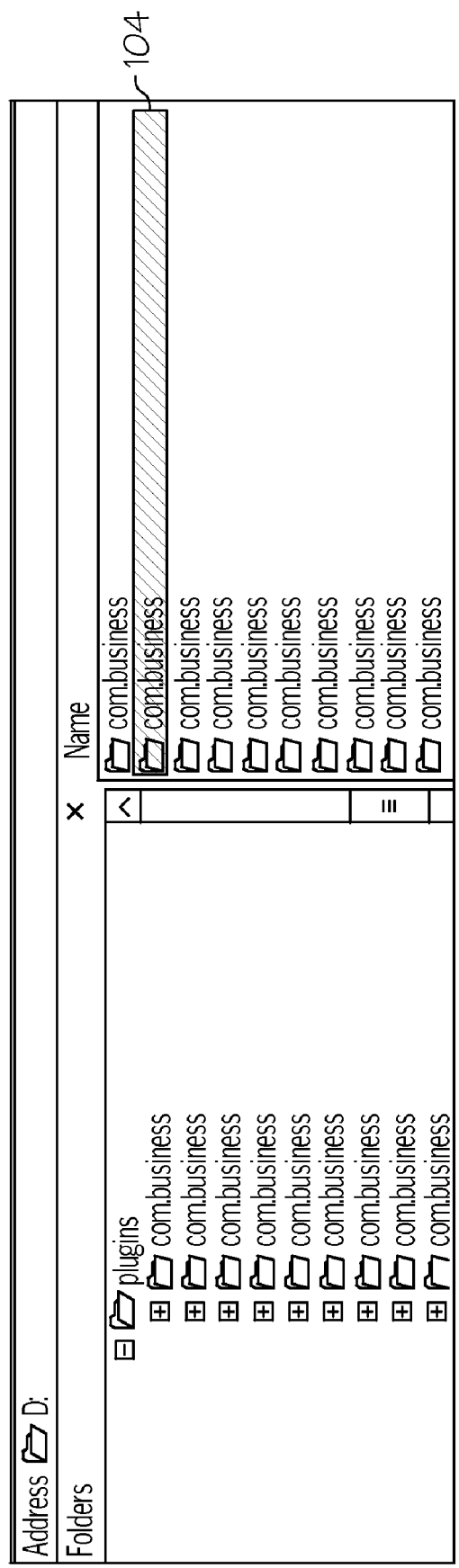

Referring now to FIGS. 2 and 3, an illustration of a long list (as used herein, a long list is a list that spans multiple pages of a computer display requiring scrolling through the multiple pages to view all the elements in the list) is shown. FIG. 2 illustrates one page 50 of the list and FIG. 3 shows a next page 60 of the list. As shown in FIGS. 2 and 3, there are multiple elements 100, 102, and 104 selected. Since they are on different pages and not viewable without scrolling up or down, the user cannot tell whether the elements on a page not currently in focus are still selected, how many have been selected, or which elements have been selected.

Figure 4:
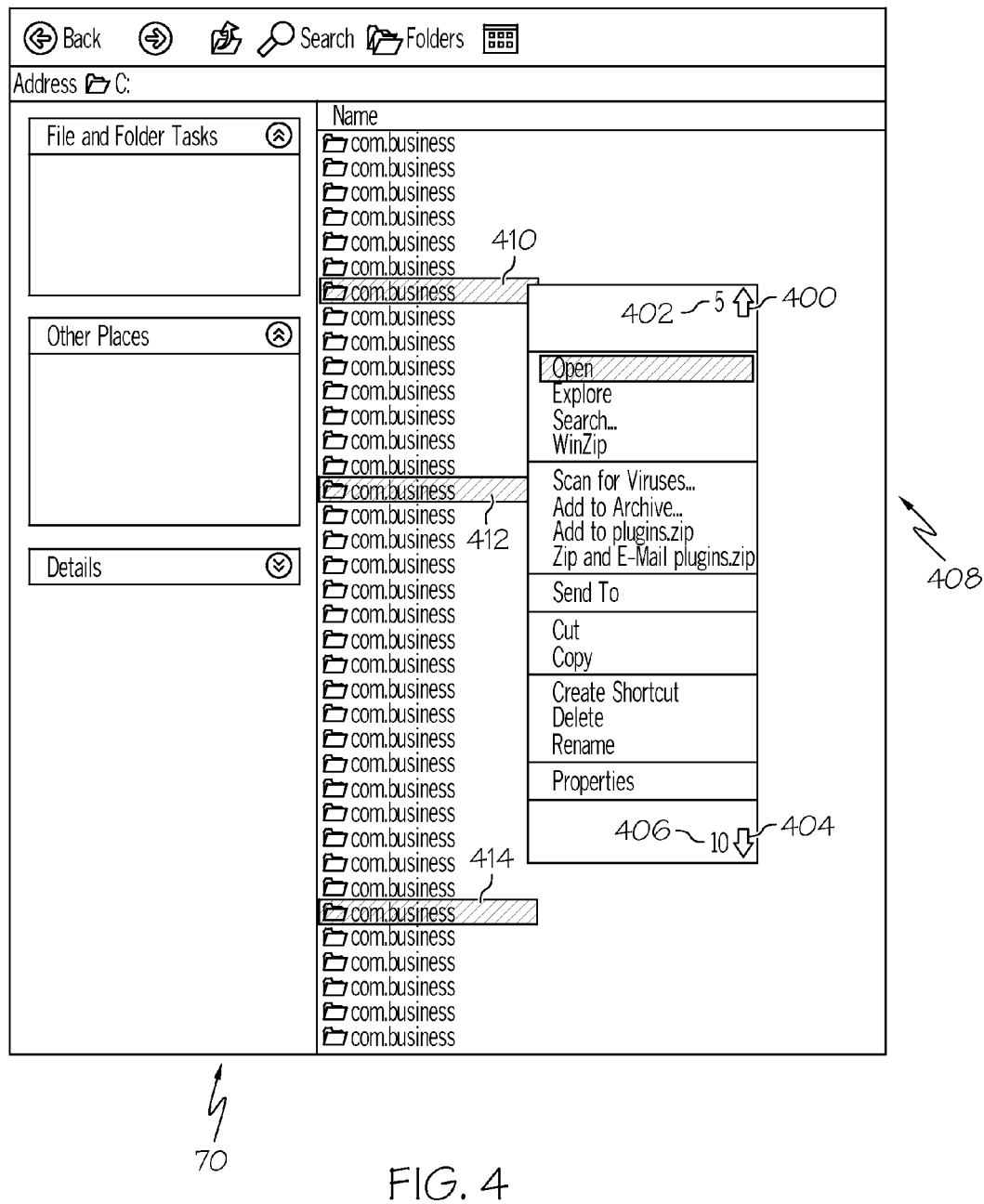
FIG. 4 illustrates an embodiment of the present invention.

One embodiment of the present invention is now illustrated in FIG. 4. While FIG. 4 only shows one page 70 of a long list, it is to be understood that at least one other page (not shown) would be required to view the entire long list. As shown, a user has opened a context menu 408. In addition to the normal elements found in the context menu 408, the present invention adds icons as visual aids to indicate previous and/or next elements have been selected. Thus, while only three elements 410, 412, and 414 are shown selected on page 70, there are additional elements selected on previous and next pages not currently in focus. A visual aid, for example, an arrow 400 pointing upward, can be used to indicate there are elements selected but not currently viewable on pages previous to page 70. Similarly, a visual aid such as an arrow 404 pointing downward can be used to indicate there are elements selected but not currently viewable on the next pages after page 70.

In addition, the present invention may provide other visual aids to the user. For example, a first number 402 can be positioned near the arrow 400 to indicate how many elements have been selected previously to page 70. In the example shown in FIG. 4, the number 402 indicates there are five elements selected previously to page 70. Also, a second number 406 can be positioned near the arrow 404 to indicate how many elements have been selected on the next pages after page 70. In the example shown in FIG. 4, the number 406 indicates there are ten elements selected on the next pages after page 70. Thus, the user knows how many elements are selected previously and how many elements are selected on the pages after the current page without having to scroll back-and-forth between pages.

The user is provided with other tools for ease of use with the present invention. For example, if the user clicks on the arrow 400, the previous pages containing selected elements not currently viewable will be brought to focus. Similarly, if the user clicks on the arrow 404, the next pages containing selected elements not currently viewable will be brought to focus. The same result may be obtained if the user drags the context menu 408 upwards or downwards, i.e., dragging the menu 408 upward will bring a previous page with selected elements into view, and dragging the menu 408 downward will bring a next page with selected elements into view.

Figure 5:
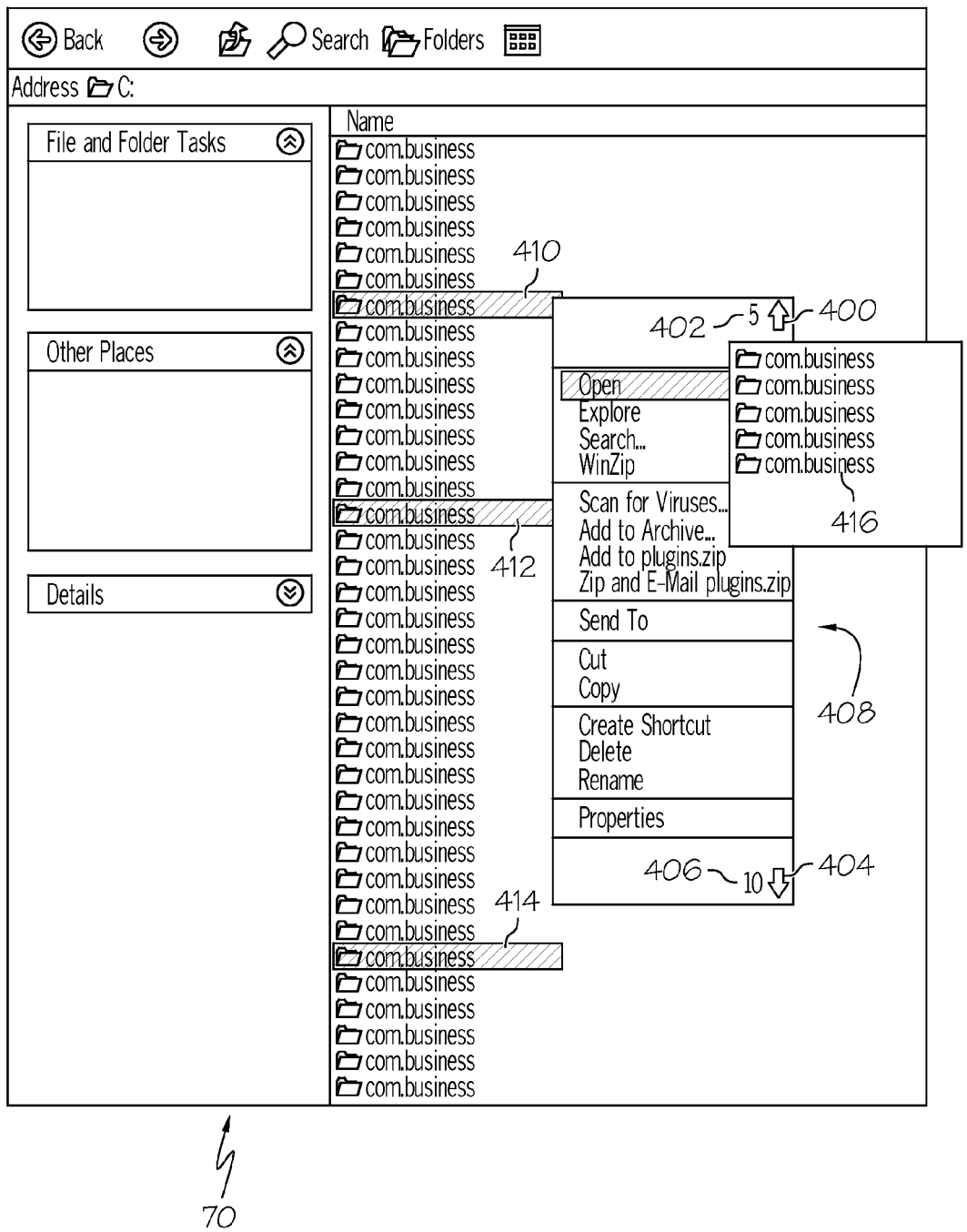
FIG. 5 illustrates another embodiment of the present invention.

Referring now to FIG. 5, a further user visual aid available with the present invention is illustrated. The same page 70 of FIG. 4 is shown in FIG. 5 with the additional visual aid. By "mousing over" arrow 400, a list 416 of the elements selected on previous pages to the current page 70 will "pop-up" into view. Although not shown, by "mousing over" arrow 404, a list of the elements selected on the next pages below the current page 70 will also "pop-up" into view.

Figure 6:
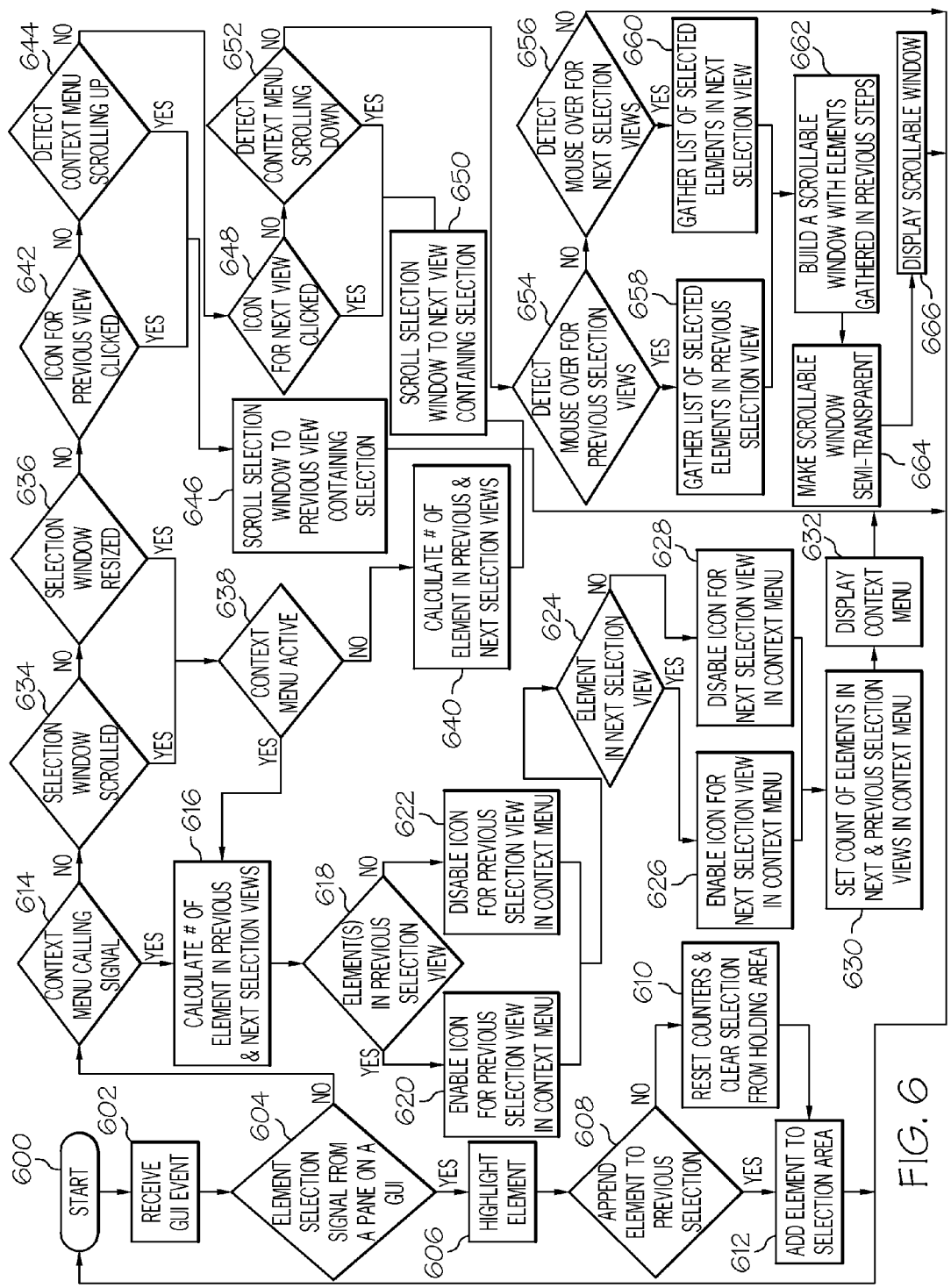
FIG. 6 is a flowchart of the present invention.

Referring now to FIG. 5 and FIG. 6, a flowchart describing the present invention is illustrated. The invention starts at 600 and a graphical user interface (GUI) event is received at block 602. It is then determined at decision block 604 whether or not an element selection signal (i.e., a user has selected an element, such as element 410 in FIG. 5) has been received from the GUI. If the response to decision block 604 is yes, the element (element 410) is highlighted at block 606. It is then determined at decision block 608 whether or not to append the highlighted element to a previous selection (i.e., the highlighted element is added to other selections already highlighted in a long list). If the response to decision block 608 is no, the present invention at block 610 resets counters and clears the selection from a holding area. Subsequent to block 610 or if the response to decision block 608 was yes, the present invention adds the element to a selection area at block 612. Then, the invention returns to block 600 to start another cycle.

If the response to decision block 604 was no, the invention checks at decision block 614 whether or not a context menu calling signal has been received. If the response to decision block 614 is yes, the number of elements in the previous and next views is calculated at block 616. It is then determined at decision block 618 whether or not the element is in a previous (i.e., before the current page) view. If the response to decision block 618 is yes, an icon indicating the element is in a previous selection view is enabled in the context menu at block 620. If the response to decision block 618 is no, an icon indicting the element is in a previous selection view is disabled in the context menu at block 622.

After block 620 or block 622, it is determined at decision block 624 whether or not the element is in the next selection view. If the response to decision block 624 is yes, the icon for a next selection view is enabled in the context menu at block 626. On the other hand, if the response to decision block 624 is no, the icon for a next selection view is disabled in the context menu at block 628. After either block 626 or 628, the count of elements in the next and previous selection views is set in the context menu at block 630. The context menu information is then displayed at block 632 and the invention returns to start at block 600.

If the response to decision block 614 is no, the present invention determines whether a selection window was scrolled at block 634. If the response to decision block 634 is no, it is determined at decision block 636 whether a selection window was resized. If the answer to decision block 636 or decision block 634 is yes, it is determined at decision block 638 whether a context menu is active. If the response is no, the number of elements in previous and next selection views is calculated at block 640 and then returns to start block 600.

If the response to decision block 636 was no, it is determined at decision block 642 whether an icon for previous views was clicked. If the response is no, the invention detects at decision block 644 whether or not there is a scrolling up action at a context menu. If the response to decision block 642 or decision block 644 is yes, a previous view containing the selection is scrolled to at block 646 and the invention returns to start at block 600.

If the response to decision block 644 was no, it is determined at decision block 648 whether an icon for a next view was clicked. If the response to decision block 648 is no, it is determined at decision block 652 whether a context menu has been detected to be scrolling down. If the response to decision block 652 or decision block 648 is yes, at block 650 the selection window is scrolled to the next view containing a selection. The invention then returns to start at 600.

If the response to decision block 652 was no, it is determined at decision block 654 whether a "mouse over" for a previous selection view was detected. If the response to decision block 654 is yes, a list of selected elements in previous selection views is gathered at block 658. If the response to decision block 654 is no, it is determined at decision block 656 whether a "mouse over" for a next selection view was detected. If the response to decision block 656 is no, the invention returns to start at block 600.

If the response to decision block 656 is yes, a list of selected elements in the next selection view is gathered at block 660. After block 660 or block 658, a scrollable window with the elements gathered in the previous steps is built at block 662. The scrollable window is made semi-transparent at block 664 and is then displayed at block 666. The invention then returns to start at block 600.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for providing a navigation environment for a user to navigate a long list of selectable elements spanning at least two pages of a computer display, comprising:

providing, with a processor, a scrollable context menu;
determining, with said processor, whether at least one element has been selected on a page in a previous view;
when at least one element is determined to have been selected in said previous view, positioning a first visual aid on said scrollable context menu to indicate said at least one element has been selected in said previous view;
determining, with said processor, whether at least one element has been selected on a page in a next view;
when at least one element is determined to have been selected in said next view, positioning a second visual aid on said scrollable context menu to indicate said at least one element has been selected in said next view;
positioning a third visual aid on said scrollable context menu comprising a numerical count of a total number of elements selected in said previous view; and
positioning a fourth visual aid on said scrollable context menu comprising a numerical count of a total number of elements selected in said next view.

2. The method of claim 1, further comprising:
scrolling to said previous view in response to clicking said first visual aid; and
scrolling to said next view in response to clicking said second visual aid.

3. The method of claim 1, further comprising scrolling said context menu upward in response to the user initiating a scrolling action to view said at least one element selected in said previous view.

4. The method of claim 1, further comprising scrolling said context menu downward in response to the user initiating a scrolling action to view said at least one element selected in said next view.

5. The method of claim 1, further comprising displaying a first list comprising all elements in said total number of elements selected in said previous view in response to a cursor being placed over said first visual aid on said scrollable context menu.

6. The method of claim 1, further comprising displaying a second list comprising all elements in said total number of elements selected in said next view in response to a cursor being placed over said second visual aid on said scrollable context menu.

7. A navigation environment system for a user to navigate a long list of selectable elements spanning at least two pages of a computer display, comprising:
a processor; and
memory connected to the processor, wherein the memory is encoded with instructions and wherein the instructions when executed comprise:
instructions for forming a scrollable context menu;
instructions for determining whether at least one element has been selected on a page in a previous view;
when at least one element is determined to have been selected in said previous view, instructions for positioning a first visual aid on said scrollable context menu to indicate said at least one element has been selected in said previous view;
instructions for determining whether at least one element has been selected on a page in a next view;
when at least one element is determined to have been selected in said next view, instructions for positioning a second visual aid on said scrollable context menu to indicate said at least one element has been selected in said next view;
instructions for positioning a third visual aid on said scrollable context menu comprising a numerical count of a total number of elements selected in said previous view; and
instructions for positioning a fourth visual aid on said scrollable context menu comprising a numerical count of a total number of elements selected in said next view.

8. The system of claim 7, further comprising:
in response to clicking said first visual aid, instructions for moving the computer display to said previous view; and
in response to clicking said second visual aid, instructions for moving the computer display to said next view.

9. The system of claim 7, further comprising instructions for displaying a first list comprising all elements in said total number of elements selected in said previous view viewable by placing a cursor over said first visual aid on said scrollable context menu.

10. The system of claim 7, further comprising instructions for displaying a second list comprising all elements in said total number of elements selected in said next view viewable by placing a cursor over said second visual aid on said scrollable context menu.

11. A computer program product for providing a navigation environment for a user to navigate a long list of selectable elements spanning at least two pages of a computer display, the computer program product comprising a tangible computer readable storage medium having computer readable program code embodied therewith, the computer readable program code comprising:
computer readable program code configured to provide a scrollable context menu;
computer readable program code configured to determine whether at least one element has been selected on a page in a previous view;
when at least one element is determined to have been selected in said previous view, computer readable program code configured to provide a first visual aid on said scrollable context menu to indicate said at least one element selected in said previous view;
computer readable program code configured to determine whether at least one element has been selected on a page in a next view;
when at least one element is determined to have been selected in said next view, computer readable program code configured to provide a second visual aid on said scrollable context menu to indicate said at least one element has been selected in said next view;
computer readable program code configured to position a third visual aid on said scrollable context menu comprising a numerical count of a total number of elements selected in said previous view; and
computer readable program code configured to position a fourth visual aid on said scrollable context menu comprising a numerical count of a total number of elements selected in said next view.

12. The computer program product of claim 11, further comprising:
computer readable program code configured to scroll to said previous view in response to clicking said first visual aid; and
computer readable program code configured to scroll to said next view in response to clicking said second visual aid.

13. The computer program product of claim 11, further comprising computer readable program code configured to scroll said context menu upward in response to the user initiating a scrolling action to view said at least one element selected in said previous view.

14. The computer program product of claim 11, further comprising computer readable program code configured to scroll said context menu downward in response to the user initiating a scrolling action to view said at least one element selected in said next view.

15. The computer program product of claim 11, further comprising computer readable program code configured to display a first list of said at least one comprising all elements in said total number of elements selected in a said previous view by placing a cursor over said first visual aid on said scrollable context menu.

16. The computer program product of claim 11, further comprising computer readable program code configured to display a second list comprising all elements in said total number of elements selected in said next view by placing a cursor over said second visual aid on said scrollable context menu.

\* \* \* \* \*